T. PADGETT.
DIRIGIBLE HEADLIGHT.
APPLICATION FILED OCT. 11, 1918.

1,311,290.

Patented July 29, 1919.
2 SHEETS—SHEET 1.

INVENTOR.
Thomas Padgett.
BY
H. E. Dunlap
ATTORNEY.

T. PADGETT.
DIRIGIBLE HEADLIGHT.
APPLICATION FILED OCT. 11, 1918.
1,311,290.
Patented July 29, 1919.
2 SHEETS—SHEET 2.
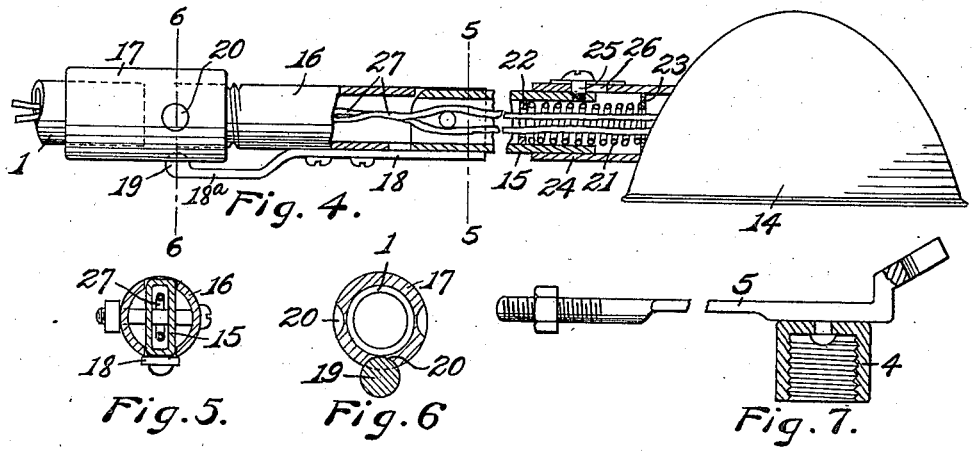
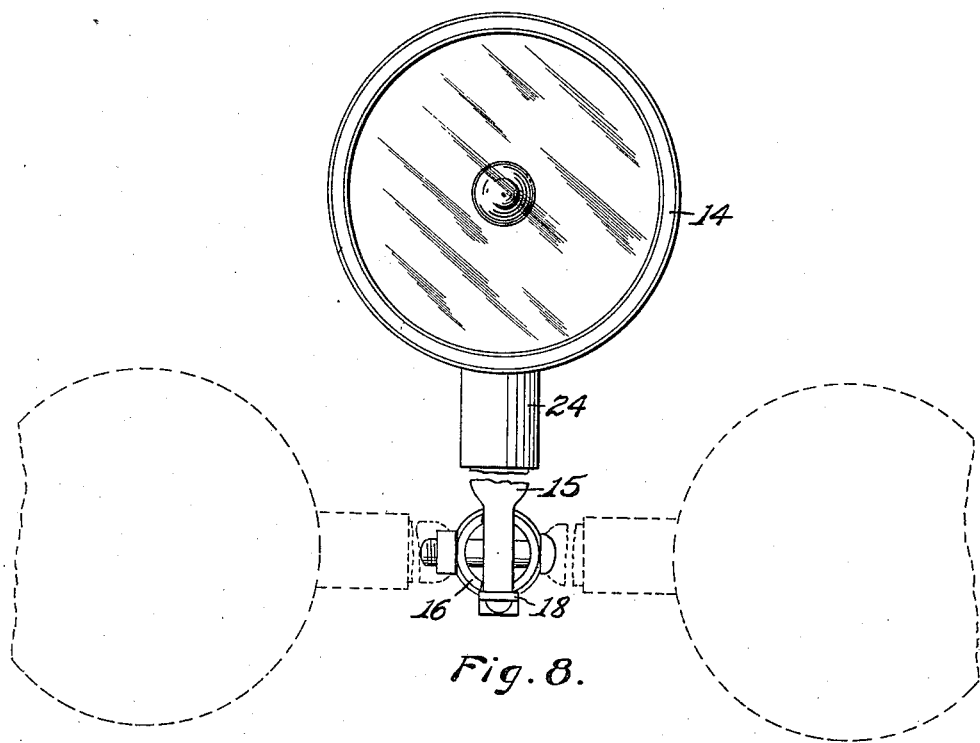
INVENTOR.
Thomas Padgett
BY
H. E. Dunlap
ATTORNEY.

UNITED STATES PATENT OFFICE.

THOMAS PADGETT, OF EAST PALESTINE, OHIO.

DIRIGIBLE HEADLIGHT.

1,311,290. Specification of Letters Patent. Patented July 29, 1919.

Application filed October 11, 1918. Serial No. 257,779.

*To all whom it may concern:*

Be it known that I, THOMAS PADGETT, a citizen of the United States of America, and resident of East Palestine, county of Columbiana, and State of Ohio, have invented certain new and useful Improvements in Dirigible Headlights, of which the following is a specification.

This invention relates broadly to dirigible headlights, and more particularly to mechanism whereby the headlights of automobiles are automatically actuated to turn with the front wheels of such automobile for more effectually illuminating the roadway.

The primary object of the invention is to provide a headlight steering mechanism of simple and inexpensive construction which is adapted for ready application to any automobile, whether the transverse steering rod be located in front or in the rear of the front axle, and whether it be required to dispose the mechanism over or under such axle.

With these and other objects in view, the invention resides in the features of construction, arrangement of parts and combinations of elements which will hereinafter be fully described, reference being had to the accompanying drawings, in which—

Fig. 4 is an enlarged view, partly in section, of the lamp standard disposed in a forwardly swung horizontal position;

Figs. 5 and 6 are sections taken respectively on lines 5—5 and 6—6, Fig. 4;

Fig. 7 is an enlarged sectional view of the axle-clamp and the attached adjustable cap; and—

Fig. 8 is an enlarged front elevation of the lamp and its supporting standard.

Referring to said drawings, in which like designating characters distinguish like parts throughout the several views—

Figure 1:
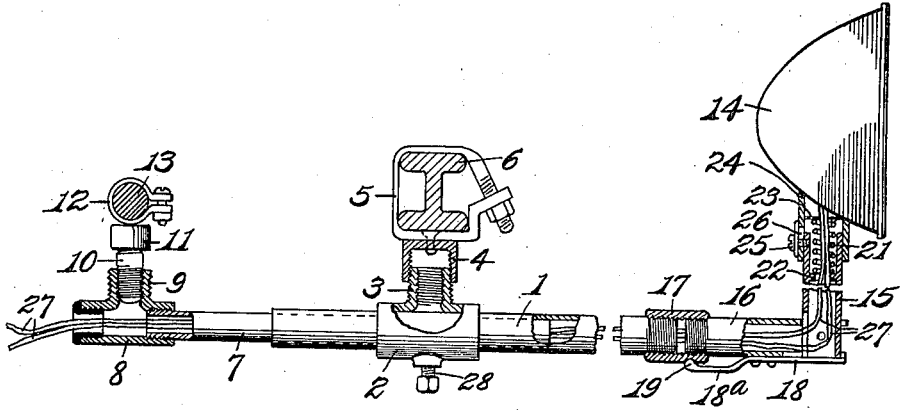
Figure 1 is a view of the invention, partly in elevation and partly in section, illustrating its application to the under side of the axle of an automobile having the steering rod located rearward of the axle.
Figure 3:
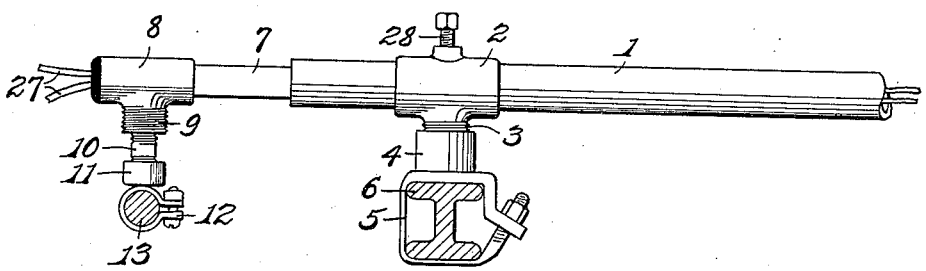
Fig. 3 is a similar view illustrating the application of the device over the axle of an automobile in which the steering rod is located rearward of the axle.

1 indicates a tubular member which has adjustably mounted thereon a pipe-T 2 the laterally projecting portion or stem 3 of which is screw threaded both exteriorly and interiorly. As shown in Figs. 1 and 3, said stem 3 is adapted to receive on its external threads an adjustable cap 4, hereinafter termed a swivel-cap, which has fixed thereto a bendable clamp 5 adapted to be rigidly secured about the front axle 6 of an automobile.

Projecting outward from the rear end of said tubular member 1 is the rear end of a tube 7 which telescopes freely with respect to said tube 1. Said tube 7 carries on the rear end thereof a pipe-T 8 having a laterally projecting portion or stem 9 which corresponds in size to that of the stem 3 of pipe-T 2 and which is also threaded both exteriorly and interiorly. As shown in Figs. 1 and 3, said stem 9 is adapted to receive interiorly thereof the lower threaded end of a post 10 which has threaded upon its upper end an adjustable cap 11. Fixed upon the face of said cap 11 is a clamp 12 adapted to be rigidly attached to the usual transverse steering rod 13 of an automobile.

The parts hereinbefore described may be disposed under the axle 6 and steering rod 13 in the manner shown in Fig. 1, or if preferred, may be disposed over such axle and steering rod, as shown in Fig. 3.

Figure 2:
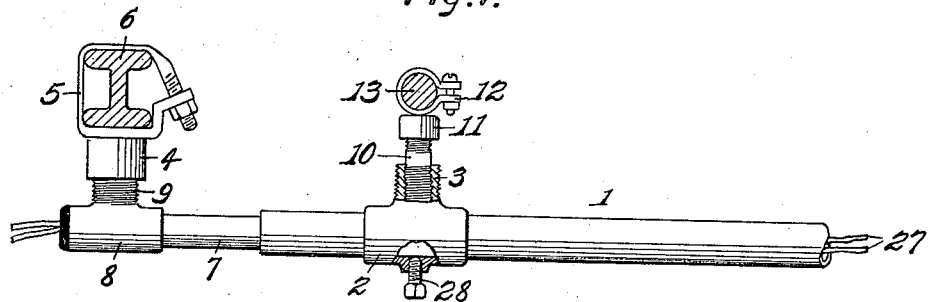
Fig. 2 is a side elevation of the telescoping members and the swivel mountings, illustrating the application thereof to an automobile in which the steering rod is located in front of the axle.

In applying the parts to automobiles having the steering rod 13 located in front of the axle 6, the positions of the swivel-cap 4 and the post 10 are interchanged, said swivel-cap being threaded upon the stem 9 of pipe-T 8 and said post 10 being mounted with its lower end threaded within the stem 3 of pipe-T 2, as shown in Fig. 2.

Variations in the relative elevations of the axle and steering rod may be compensated for by adjustment of the swivel-cap 4 and the post 12 with respect to the stems of their respective pipe-T's.

The caps 4 and 11 have their threads loosely engaging the threads of their supports or mountings so that they will freely rotate, thus in effect providing swivel joints which permit such free lateral swinging movement of the parts with respect to the axle 6 as is required by the movements of the steering rod. Variations in the distance between the axle and steering rod resulting from shifting of the latter are provided for by having the tubes 1 and 7 arranged in telescoping relation.

The lamp 14 is supported by the front end of the tube 1. While any appropriate supporting means may be interposed between said tube and the lamp so that the latter will normally be disposed at a proper elevation, I prefer to employ substantially the means disclosed in the drawings, in which the lamp is carried upon the end of a standard 15 which is adapted to be elevated to and lowered from a substantially upright position. Said standard may be pivotally mounted directly upon the front end of the tube 1, or it may be mounted upon a short tube 16 which is coupled to said tube 1 by means of a union 17, as shown in Figs. 1 and 4. In either case said standard is pivoted in such manner that it may occupy either the upright position shown in Fig. 1 or the forwardly swung horizontal position shown in Fig. 4, the last mentioned position being required to permit free access to unhindered operation of the starting crank of the automobile. A spring 18 secured to the under side of the front end of the tube 16 has its front end free and underlying the lower end of said standard 15 and normally serving to yieldingly hold the latter against movement from its upright position. Said spring may also have a rearward extension 18ª terminated by an upwardly directed lug or knob, as 19, adapted to rest in one of a plurality of seats 20 provided on the exterior surface of the union 17. Obviously, the knob 19 normally seats in the lowermost of said seats 20, maintaining the tube 16 against rotation in the union 17. However, when said knob is raised from said lowermost seat, said tube may be rotated to the right or left, thus swinging the lamp and its supporting standard to the right or left, as shown in dotted lines in Fig. 8, in either of which positions access may be had to the starting crank of the automobile.

To relieve the lamp from jolts and jars to which it would otherwise be subjected in road travel, a suitable spring 21 is interposed between said lamp and the standard 15. While any suitable arrangement of such spring may be employed, I have herein shown the spring seated at its lower end upon an apertured cross-web 22 provided in the tubular standard 15 and having its upper end disposed against a cross web 23 provided within a socketed member 24 carried by the lamp. Said member 24 has its lower end disposed in loosely embracing relation to the upper end of the standard 15. A pin 25 fixed in said standard projects outward through a vertical slot 26 provided in the socketed member 24, said pin serving to maintain the telescopic relation between said member and said standard while not interfering with relative vertical movement of said parts.

Current is suplied to the lamp by conducting wires 27 which lead thereto through the interiors of the pipe-T 8, tubes 7 and 1, union 17, tube 16, standard 15 and socketed member 24, as shown in Fig. 1.

A set screw 28 serves to hold the pipe-T 2 in adjusted position on the tube 1.

It is designed that the lamp shall occupy a substantially central position in front of the usual radiator of the car. Consequently, the parts composing the invention will be attached to the axle 6 and steering rod 13 at points approximately midway between their ends. Obviously, the standard 15 may be straight, as shown, or it may be bent rearward intermediate its ends when it is desired that the lamp shall be supported nearer the radiator than would be permitted by a vertically disposed straight standard.

What is claimed is—

1. A headlight steering mechanism comprising, in combination with the front axle and the transverse steering rod of an automobile, two tubular members disposed in telescopic relation and normally in parallelism with the longitudinal axis of the automobile, a pipe-T carried by each of said members, each of said T's having its stem extended laterally and threaded both exteriorly and interiorly, said stems being of even size, a cap-nut, an axle embracing clamp attached to said cap-nut, a post having its opposite ends threaded, a cap-nut threaded upon the upper end of said post, a steering rod clamp attached to the last mentioned cap-nut, said post and the first mentioned cap-nut being adapted to be interchangeably carried by the stems of said T's with the lower end of said post received interiorly and the first mentioned cap-nut received exteriorly of said stems, and a lamp carried by the foremost of said tubular members.

2. A headlight steering mechanism comprising, in combination with the front axle and the transverse steering rod of an automobile, two tubular members disposed in telescopic relation and normally in parallelism with the longitudinal axis of the automobile, a laterally extending arm carried by each of said members, said arms being of corresponding size, an axle-embracing clamp and a steering-rod-embracing clamp, means carried by said clamps whereby swivel-like connection may be had with either of said arms, said means being attachable interchangeably to said arms according to the relative positions of said axle and said steering rod, and a lamp carried by the foremost of said tubular members.

3. A headlight steering mechanism comprising, in combination with the front axle and the transverse steering rod of an automobile, two tubular members disposed in telescopic relation and normally in parallelism with the longitudinal axis of the automobile, a laterally extending arm carried by each of said members, said arms being of corresponding size, an axle-embracing clamp and a steering-rod-embracing clamp, means carried by said clamps whereby swivel-like connection may be had with either of said arms, said means being attachable interchangeably to said arms according to the relative positions of said axle and said steering rod, a standard having pivotal connection with the foremost of said tubular members, and a lamp carried by said standard.

4. A headlight steering mechanism comprising, in combination with the front axle and the transverse steering rod of an automobile, two tubular members disposed in telescopic relation and normally in parallelism with the longitudinal axis of the automobile, a laterally extending arm carried by each of said members, said arms being of corresponding size, an axle-embracing clamp and a steering-rod-embracing clamp, means carried by said clamps whereby swivel-like connection may be had with either of said arms, said means being attachable interchangeably to said arms according to the relative positions of said axle and said steering rod, a standard having pivotal connection with the foremost of said tubular members, a lamp carried by said standard and shock-absorbing means interposed between said lamp and said standard.

5. A headlight steering mechanism comprising, in combination with the front axle and the transverse steering rod of an automobile, two tubular members disposed in telescopic relation and normally in parallelism with the longitudinal axis of the automobile, a pipe-T carried by each of said members, one of said T's being adjustable along its carrying member, each of said T's having its stem extended laterally and threaded both exteriorly and interiorly, said stems being of even size, a cap-nut, an axle-embracing clamp attached to said cap-nut, a post having its opposite ends threaded, a cap-nut threaded upon the upper end of said post, a steering-rod clamp attached to the last mentioned cap-nut, said post and the first mentioned cap-nut being adapted to be interchangeably carried by the stems of said T's with the lower end of said post received interiorly and the first mentioned cap-nut received exteriorly of said stems, and a lamp carried by the foremost of said tubular members.

6. A headlight steering mechanism comprising, in combination with the front axle and the transverse steering rod of an automobile, two tubular members disposed in telescopic relation and normally in parallelism with the longitudinal axis of the automobile, a pipe-T carried by each of said members, each of said T's having its stem extended laterally and threaded both exteriorly and interiorly, said stems being of even size, a cap-nut, an axle-embracing clamp attached to said cap-nut, a post having its opposite ends threaded, a cap-nut threaded upon the upper end of said post, a steering-rod clamp attached to the last-mentioned cap-nut, said post and the first mentioned cap-nut being adapted to be interchangeably carried by the stems of said T's with the lower end of said post received interiorly and the first mentioned cap-nut received exteriorly of said stems and adjustable with respect to the latter to adjust the positions of said clamps with respect to said tubular members, and a lamp carried by the foremost of said members.

7. A headlight steering mechanism comprising, in combination with the front axle and the transverse steering rod of an automobile, two tubular members disposed in telescopic relation and normally in parallelism with the longitudinal axis of the automobile, a pipe-T carried by each of said members, each of said T's having its stem extended laterally and threaded both exteriorly and interiorly, said stems being of even size, a cap-nut, an axle-embracing clamp attached to said cap-nut, a post having its opposite ends threaded, a cap-nut threaded upon the upper end of said post, a steering-rod clamp attached to the last mentioned cap-nut, said post and the first mentioned cap-nut being adapted to be interchangeably carried by the stems of said T's with the lower end of said post received interiorly and the first mentioned cap-nut received exteriorly of said stems and adjustable with respect to the latter to adjust the positions of said clamps with respect to said tubular members, one of said T's being adjustable along the member by which it is carried, and a lamp carried by the foremost of said members.

8. A headlight steering mechanism comprising, in combination with the front axle and the steering rod of an automobile, a pair of horizontally disposed telescopically related members normally disposed at right angles to said axle, a sleeve-like member adjustably mounted on one of said telescoping members, a laterally extending arm carried each by said sleeve-like member and by the other of said telescoping members, said arms corresponding in form and size one with the other, an axle-embracing clamp and a steering-rod-embracing clamp, each of said clamps having attached thereto means adapted for interchangeable swivel-like connection with said arms according to the relative positions of said axle and said steering rod, and a lamp carried by the foremost of said telescoping members.

In testimony whereof, I affix my signature in presence of two subscribing witnesses.

THOMAS PADGETT.

Witnesses:
FRANK SANSENBAUGHER,
JOHN M. NUTT.